United States Patent [19]

Blankenbecler et al.

[11] Patent Number: 5,236,486
[45] Date of Patent: Aug. 17, 1993

[54] SHAPED GRADIENT FABRICATION IN LENSES BY MOLDING FROM AXIAL GRADIENT

[75] Inventors: Richard Blankenbecler, Stanford; Max A. Wickson, Mountain View, both of Calif.

[73] Assignee: LightPath Technologies, Inc., Tucson, Ariz.

[21] Appl. No.: 782,164

[22] Filed: Oct. 24, 1991

[51] Int. Cl.⁵ .............................. C03B 23/00
[52] U.S. Cl. ........................ 65/61; 65/30.1; 65/37; 65/54; 65/102; 65/106
[58] Field of Search .............. 65/38, 39, 23, 102, 65/106, 64, 54, 61, 37, 30.1

[56] References Cited

U.S. PATENT DOCUMENTS

| | | | |
|---|---|---|---|
| 914,316 | 3/1909 | Seymour | 65/39 |
| 2,596,799 | 5/1952 | Tiuyer | 65/39 |
| 2,795,084 | 6/1959 | Littleton | 65/23 |
| 3,150,951 | 9/1969 | Mayhew | 65/362 |
| 3,208,839 | 9/1965 | Nordberg | 65/24 |
| 3,899,315 | 8/1975 | Siegmund | 65/39 |
| 4,073,579 | 2/1978 | Deeg et al. | 65/37 |
| 4,902,102 | 2/1990 | Breidenthal | 65/39 |

FOREIGN PATENT DOCUMENTS 62-43602 2/1987 Japan.

OTHER PUBLICATIONS

Winter, 1943, Jour. Amer. Ceramic Soc. 24, pp. 189-200 Transformation Region of Glass.

Primary Examiner—Joye L. Woodard
Attorney, Agent, or Firm—Benman & Collins

[57] ABSTRACT

Shaped gradient profiles of index of refraction in lenses are fabricated from axial gradients. While the resulting lens has both radial (or cylindrical) and axial components, and, strictly speaking, is not a pure radial (cylindrical) gradient, nonetheless, the presence of both the radial and axial components or cylindrical and axial components provides lens designers with greater flexibility in lens design than heretofore existed.

9 Claims, 4 Drawing Sheets

SHAPED GRADIENT FABRICATION IN LENSES BY MOLDING FROM AXIAL GRADIENT

TECHNICAL FIELD

The present invention relates to lenses having a graded index of refraction, and, more particularly, to (a) lenses having a spherical or a generalized spherical gradient which can alternatively be considered to be a combination of a radial gradient and an axial gradient therein, or (b) lenses having a cylindrical or generalized cylindrical gradient. The lens material can be either glass or plastic.

BACKGROUND ART

The fabrication of lenses with a radial or a spherical gradient geometry has been a problem of considerable interest. Several methods may be considered to fabricate lens blanks with a pure radial gradient. However, such methods invariably involve a process limitation which makes achieving a gradient with the desired design profile and of large (macro) size nearly impractical.

The following definitions are provided as an aid to understanding the invention:

Axial Gradient:

The index is constant in planes orthogonal to the optical axis of the lens, which is denoted as the z-axis, but varies as one moves along the z-axis. The index is a function of z only.

Spherical Gradient:

The index is constant on spherical surfaces that surround a central point. If the lens is cut out of such an index distribution, it can be thought of as an off-center (thin) slice out of an onion. The index is a function of the distance from the center R, where $R^2 = z^2 + x^2 + y^2$.

Generalized Spherical Gradient:

The surfaces of constant index are surfaces of revolution; they are formed by rotating parabolas, hyperbolas, or any other smooth curve around the optical axis. Rotating a circle yields a spherical surface.

Radial Gradient:

The index is constant along the optical axis of the lens, but varies as a function of the two-dimensional transverse distance from the optical axis. The surfaces of constant index form tubes, with the axis at their center. The index is in-dependent of z, but is a function of the distance r from the z-axis, where $r^2 = x^2 + y^2$.

Generalized Cylindrical Gradient:

The surfaces of constant index are surfaces of translation; they are formed by translating arcs of circles, parabolas, hyperbolas, or any other smooth curve along an axis perpendicular to the optical axis. Translating a circle yields a tube-like surface. The index is a function of the z and the transverse distance x. The index is independent of y, the direction of translation.

The term "shaped gradient" will be employed herein for conciseness to describe all the foregoing gradients, and includes the combination of radial (two-dimensional transverse) plus axial, which results in a spherical or generalized spherical gradient, and the combination of one-dimensional transverse plus axial, which results in a cylindrical or generalized cylindrical gradient. Further, any arbitrary shape of the gradient may be employed, such as corrugations, dimples, saddles, etc.

The fabrication of lenses with axial gradients is known; see, e.g., U.S. Pat. No. 5,044,737, issued Sep. 3, 1991, and assigned to the predecessor of the present assignee. In that reference, a discussion of so-called "micro" processes is given. Such micro processes include diffusion into a lens blank of a refractive index-altering element of differing atomic number by immersion in a molten salt bath of, e.g., silver chloride or by coating the lens blank with a thin layer that has a different index of refraction and then heating. Other techniques include implantation of ions into the surface of the lens blank and chemical vapor deposition of a species onto the surface thereof.

All such micro processes suffer from the fact that a substantial period of time is required to produce a gradient in the index of refraction, and that in any event, the gradient is invariably Gaussian or a variation thereof and the processing results in a gradient only near the surface. Gradients throughout relatively thick lens blanks (thickness greater than about fifteen millimeters) are not achievable in reasonable periods of time for commercial applications. Further, the maximum practically achievable index change is on the order of 0.05 for these micro lenses. This limits the use of these gradient index of refraction (GRIN) lenses.

Recently, so-called "macro" processes have been developed. By macro process is meant the use of bulk glass processing techniques, which can result in considerably thicker glass blanks having a gradient in index of refraction that varies substantially continuously through the entire lens blank. Examples of such processing includes fusing at least two layers of frits or plates together (each layer having a slightly different index of refraction). Typically, the top and bottom members are each of separate composition, with the intermediate members, if present, mixtures of the two end compositions to give a desired gradient profile or glasses of intermediate composition between the top and bottom members. Examples of such processing techniques are described in U.S. Pat. Nos. 4,883,522, 4,907,864, and 4,929,065, each assigned to the predecessor of the present assignee.

The macro processes yield lens blanks which have greater thicknesses than obtained by micro processes; dimensions of nearly 50 mm with a gradient along the entire thickness axis are easily fabricated. Further, differences in the index of refraction from one side to the other of 0.1 to 0.25 are routinely achievable, with differences approaching 0.5 attainable.

The macro processes permit fabrication of lens blanks with design parameters not heretofore available to the lens and optical designer. For example, it is desired to correct not only spherical aberrations, but also chromatic aberrations. Further, it is desired to reduce the effects of temperature on the optical properties.

Shaped gradient lenses permit new designs and arrangements of optical elements, thereby forming optical systems with desirable properties. The spherical and chromatic properties of a shaped gradient lens are different from both a homogeneous lens and a lens with a purely axial gradient profile. A shaped lens blank with a combination of a radial and an axial index profile will extend the options of optical designers, allow better design compromises, and lead to more efficient optical instruments. Consequently, efforts continue to develop processes for fabricating shaped gradients in lens blanks.

DISCLOSURE OF INVENTION

In accordance with the invention, a method of making a lens blank having a shaped gradient of index of refraction from a lens blank plate having an axial gradient of index of refraction, comprises controllably altering the conformation of the plate to provide a curved plate having curved upper and lower external surfaces thereof, with the index of refraction varying parallel to the curved external surfaces. Further, portions of the conformed plate are removed to provide the lens blank having an internally shaped gradient of the index of refraction. The original lens with an axial gradient may be fabricated by any of the available processes and methods discussed above.

Shaped gradient profiles of the index of refraction are thus fabricated from axial gradients. The resulting lens has both radial (or one-dimensional) and axial components, and, strictly speaking, is not a pure radial (or one-dimensional) gradient; accordingly, the term "shaped" gradient is employed herein. The presence of the radial (or one-dimensional) gradient component in these shaped gradient profiles provides lens designers with greater flexibility in lens design than heretofore existed.

The index of refraction in the shaped lens blank is thus seen to vary substantially continuously in plural directions within the lens blank, having been fabricated by deforming a lens blank having a substantially continuous axial gradient of the index of refraction with substantially planar contours of constant index of refraction.

BEST MODES FOR CARRYING OUT THE INVENTION

While the processes described above are an important advance in the production of GRIN lenses, the processing of shaped gradient lenses has presented formidable challenges to both the micro and macro approaches.

Consider an axial lens (the concept can be directly extended to the double axial lens blank described in the above-referenced U.S. Pat. No. 5,044,737) of thickness T with a general index profile of $n(z)$, where $n(0)=n_0$ and $n(T) = n_1$. For example, if the index profile in the plate is linear, we have $$n(z) = n_0 + \frac{(n_1 - n_0)z}{T} \tag{1}$$

Figure 1:
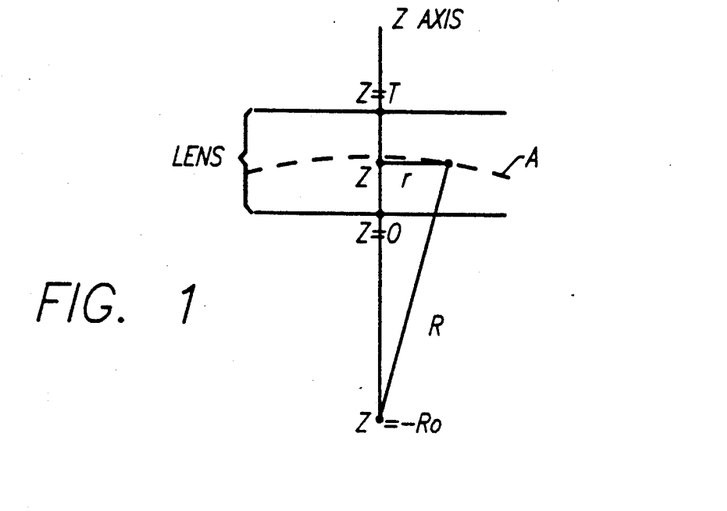
FIG. 1 depicts the coordinate system used in conjunction with calculating radial profiles in accordance with the invention.

Now imagine that the plate is heated and then molded (or pressed) into a spherical shape whose inside radius (corresponding to the point $z=0$) is $R_0$ and outside radius must therefore be $R_1=R_0+T$. The coordinate system used in these calculations is depicted in FIG. 1; r is the distance from the z-axis, $r^2=x^2+y^2$, and R is the radius of curvature of the mold.

Neglecting any flow that occurs during the molding process (we will return to this point later), the index profile will be denoted by $N(R)$, where $N(R)$ is given for a general profile $n(z)$ by $$N(R)=n(R-R_0), \tag{2}$$

with $R^2=(R_0+z)^2+r^2$. The quantity R is the usual spherical coordinate, except that z is measured from the inside surface of the lens blank. Note that for values of $R_0$ large compared to z and r, the usual situation, we have $R=R_0+z+r^2/2R_0+\ldots$.

The linear index profile therefore becomes after molding $$N(R) = n_0 + \frac{(n_1 - n_0)(R - R_0)}{T} \tag{3}$$

For large $R_0$, this becomes $$N(R) = n_0 + (n_1 - n_0)\left[\frac{z}{T} + \frac{r^2}{(2TR_0)}\right] \tag{4}$$

A new feature, a quadratic radial (transverse) index profile, has thereby been generated in addition to the remnant of the initial axial profile. For $n_1<n_0$, this can be a converging lens.

As another example, allow the index profile in the plate to be a combination of linear and quadratic terms, such as $$n(z)=n_0[1+(Z/T)a+(Z/T)^2b] \tag{5}$$

After slumping or molding, this will again lead to a combination of an axial and a quadratic radial profile as above, Eqn. 4. It will be noted that for the particular choice $a=2R_0b/T$, the index profile after molding becomes without approximation $$N(R) = n_0\left[1 + \frac{(R^2 - R_0^2)b}{T^2}\right], \tag{6}$$

where in terms of simpler coordinates, $$(R^2-R_0^2)=[(R_0-Z)^2-R_0^2]+r^2 \tag{7}$$

This is exactly quadratic in r for any value of $R_0$.

Much more general profiles can be generated by:
1. starting from more complex axial profiles;
2. using other geometric shapes for the molds (such as ellipse, hyperboloid, parabola of revolution, etc.);

3. using cylindrical molds of a general geometric shape (such as circular cylinders, ellipsoidal cylinders, parabolic cylinders, hyperbolic cylinders, etc.). The results are similar to the above formulae with $r=x$.

The focal length may be determined approximately for a flat-plate lens of thickness t ground out of the radial lens blank. It is a simple matter to extend the argument to the case of spherical surfaces on the lens.

For the particular choice described by Eqns. 6 and 7, the index profile is given by $$N(R) = n_0 + (n_1 - n_0) \frac{[(R_0 + z)^2 - R_0^2] + r^2}{T(2R_0 + T)} \qquad (8)$$

Now the z-dependence of the index profile will change the phase of the wave in passing through the lens blank but will have a negligible effect on the focusing properties. The r-dependence will control the major focusing effects.

Note that for a cylindrical lens, the formulas are the same form, but the quantity $r=x$, since y forms the axis of the cylinder.

Consider parallel rays, from a point light source at infinity, incident upon a spherical lens with planar front and back surfaces. If the lens were homogeneous, there would be no effect on the rays except for a time delay in passing through the index region. However, in passing through a thickness t of a gradient lens, the ray at a distance r from the center will be bent towards the optical axis inside the lens through an angle of approximately $$A_i = -\frac{t}{n} \frac{dn(r)}{dr} = 4 \frac{t(n_0 - n_1)}{T(n_0 + n_1)} \frac{r}{(2R_0 + T)} \qquad (9)$$

In passing through the planar rear face of the lens the ray is refracted through to the exterior angle $A_{out}$, where for small angles, Snell's law yields $$A_o \approx A_i n_0 \qquad (10)$$

It will be recalled that $n_0$ is the index at the exit side of the lens (here we have neglected the amount of the lens ground off in forming the planar surfaces).

The focal length f and the radius r are related approximately by $r=A_o f$. Thus, the focal length f of a plane sided lens is given roughly by the relation $$f \approx \frac{T(n_0 + n_1)}{2tn_0(n_0 - n_1)} (R_0 + \tfrac{1}{2}T) \qquad (11)$$

For the linear index profile with a large value of $R_0$, the index shape is given by Eqn. 4, $$N(R) = n_0 + (n_1 - n_0)\left[\frac{z}{T} + \frac{r^2}{2TR_0}\right] \qquad (12)$$

It turns out that the focal length for this case is given by the same formula as given in Eqn. 11 above (using the same level of approximation).

The manufacture of glasses with shaped gradients from axial gradients is achieved by adding an additional step to the process for making axial profiles. Such process of making axial gradients in plates of glass is set forth in U.S. Pat. No. 4,907,864, and thus forms no part of this invention. Indeed, an axial lens blank fabricated by any method can be utilized by the methods of this invention to produce a shaped index lens.

There are at least three ways to achieve the shaped gradient profiles of the invention:
1. free gravity slumping,
2. pressing (without viscous flow), and
3. pneumatic pressing.

Each of these ways is discussed below.

The molds used in the practice of the invention may have any surface of revolution, including, but not limited to, spheroid, hyperboloid, parabaloid, ellipsoid, aspheroid, or other smooth curve of revolution. Also, cylindrical surfaces may be used as the mold surface. The gradient that results from the use of such surfaces is called "shaped", and will include both axial and radial components or axial and cylindrical components.

The controlled process of the invention, which conforms a surface of the lens blank to the mold surface, generates an internal surface contour. This contour gives the optical designer freedom to accomplish phase shaping of the transmitted wave. For example, if a light source such as a laser has a "dimple" in the center of its propagated beam, a lens made by the process of the invention could convert the propagated beam into a planar wave by presenting a different optical path to different parts of the beam; this is called "wave-front shaping".

Turning now to the various embodiments of controlled conformational shaping to form a lens blank, free gravity slumping involves providing a plate having the desired axial profile therein and heating the plate to a sufficient temperature to cause the glass to sag, i.e., to "slump", in a controlled manner over a precision shaped form. Such controlled slumping is depicted in FIGS. 2a-2d.

Figure 2A:
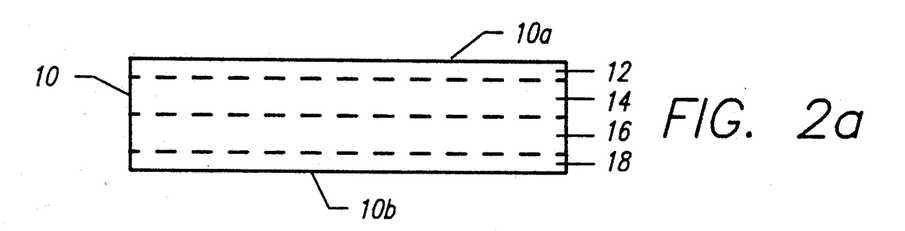
FIG. 2a is a cross-sectional view of the original axial gradient blank, with the dashed lines showing the planes of constant index of refraction.

FIG. 2a is a cross-sectional view of a lens blank 10 having a plurality of layers 12, 14, 16, 18, each of a different index of refraction, to provide a graded index of refraction from the top surface 10a to the bottom surface 10b. The boundaries between the layers are shown in dotted lines for clarity. In actual practice, there is no discernible boundary between layers after forming the lens blank, and the index changes smoothly throughout the entire lens blank. For lens blanks fabricated by other methods, the dashed lines mark the planes of constant index.

Figure 2B:
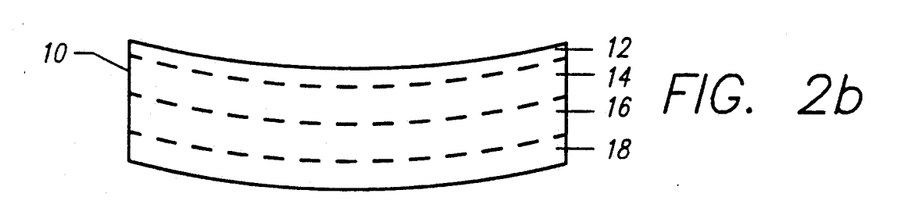
FIG. 2b is a cross-sectional view showing the profile of the glass plate after molding or allowing the plate to slump.

FIG. 2b shows the result of allowing the lens blank 10 to slump. For example, the lens blank is placed on a suitable mold surface (as described above) of appropriate composition (not shown in FIG. 2b) and heated to a temperature somewhat above the softening point of the layer having the highest softening point.

Slumping should be done at or near the "softening point" of the layer having the highest softening temperature. At the softening point, the viscosity is equal to $10^{7.6}$ dPa (poises) and the glass will rapidly deform under its own weight. In this condition, the material is described as "plastic", and between $10^7$ and $10^4$ dPa is considered "viscous". Viscous flow will occur in this state and is to be avoided. At the proper slump temperature, there should be no evidence of flow, and all edges of the blank should remain sharp. Time is used advantageously in free gravity slumping to allow low temperatures and higher viscosities to give the desired result.

Figure 2C:
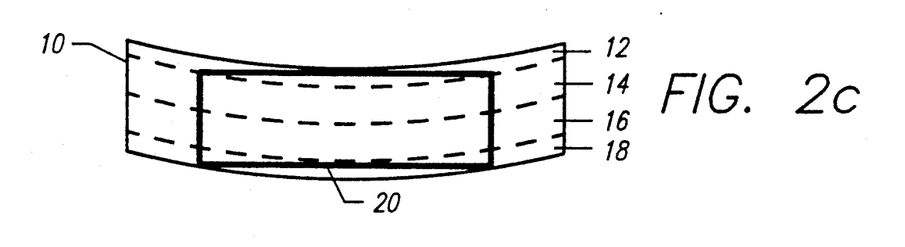
FIG. 2c is a cross-sectional view of FIG. 2b, showing the region to be ground.

FIG. 2c outlines the area 20 to be ground to provide a lens blank 10' in accordance with the invention.

Figure 2D:
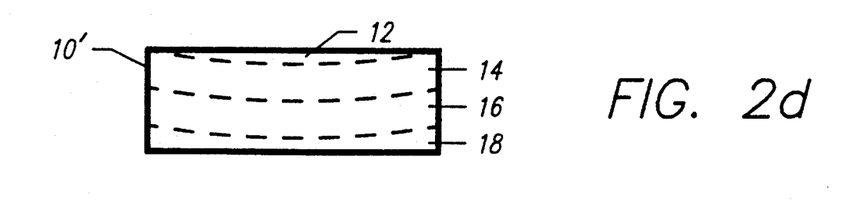
FIG. 2d is a cross-sectional view of the final lens blank after the grinding operation.
Figure 3A:
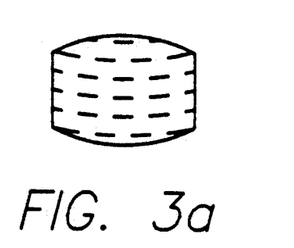
FIGS. 3a-f are cross-sectional views of various combinations of plano/convex/concave lenses fabricated in accordance with the invention.
Figure 3B:
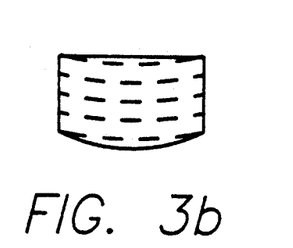
Figure 3C:
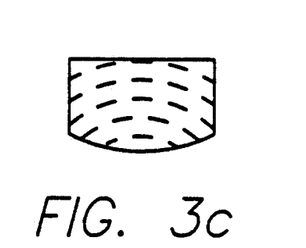
Figure 3D:
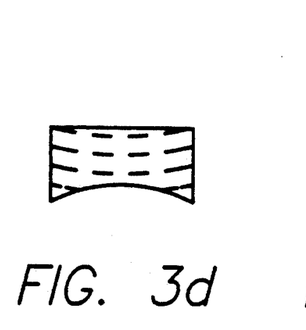
Figure 3E:
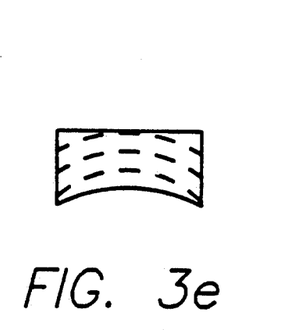
Figure 3F:
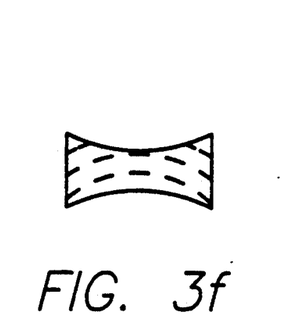

FIG. 2d shows the final lens blank 10'. While parallel plane surfaces are shown, it will also be appreciated that various combinations of planar, concave, and convex surfaces may be employed in the fabrication of the lens blank 10'. Such combinations are depicted in FIGS. 3a-3f, and include convex-convex (FIG. 3a), concave-concave (FIG. 3b), plano-convex, with the gradient going either way (FIGS. 3c-d), and plano-concave, with the gradient going either way (FIGS. 3e-f).

Alternatively, pressing the softened glass or plastic may provide a more accurate and/or faster slumping of the material. Pressing in this case does not involve compression of the glass or plastic, but mechanical force exerted to the outside surfaces to guide the material into its final position. Further, the pressing is done with a minimum viscous flow. Viscous flow should not occur at a viscosity above about $10^8$ dPa in glass.

Figure 4A:
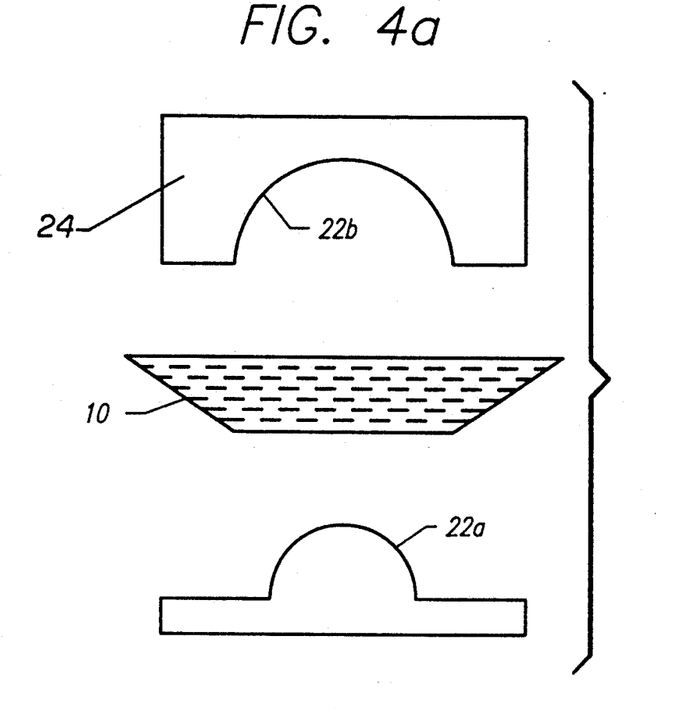
FIG. 4a is a cross-sectional view, depicting placement of a pre-shaped lens blank having an axial gradient profile between convex and concave surfaces.
Figure 4B:
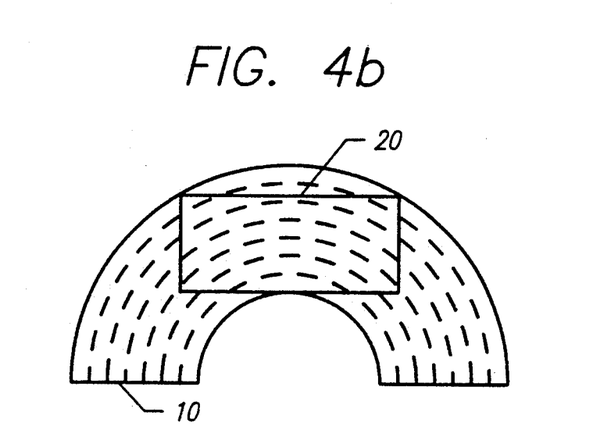
FIG. 4b is a cross-sectional view, depicting the profile of the glass plate after pressing, and also depicting the region to be ground.

The present state of the practicing art of slumping and molding allows the placement of the lens surfaces to less than about one wavelength of light. It is expected that the gradient index profile can be positioned with the same or even better accuracy. FIGS. 4a and 4b depict this alternative.

Prior art slumping on plane glass mirrors has demonstrated peak-to-valley errors of about 0.040 inch in slumped spherical or aspheric mirror blanks with outer diameters of 12 to 40 inches, using refractory as a mold material (slumping surface). Fused silica as a mold material has produced more accurate and desirable results, less than one wavelength peak-to-valley error over the same outer diameters. It will be appreciated that these surface conformity figures relate only to the surface which contacts the mold and do not necessarily indicate spherical placement error within the inner material.

FIG. 4a illustrates a cross-section of the tooling 22 and an axial blank 10 before pressing, while FIG. 4b shows a cross-section of the formed material after pressing. These drawings specifically show hemispherical pressing tools with relatively short radii. Non-hemispherical tools with longer radii may also be employed in the practice of the invention.

The glass or plastic lens blank 10 is guided down onto the bottom tool 22a and centered using a cylindrical sleeve, or guide, 24 that surrounds the entire mold assembly. When the material has begun to soften, the top concave form 22b is lowered in a controlled and even manner to the axial blank's original thickness above the convex form 22a. This should cause no unwarranted compression of the gradient. Any material flow around the outer edges of the molds must be restricted. The pressure required depends upon the temperature and the melting point throughout the lens blank. However, as a general guideline, the blank 10 at its flow point temperature would require very little mechanical pressure to be formed into its final shape, typically less than about 10 psi for glass.

Advantageously, the high index surface of the lens blank 10 is placed against the smaller convex tool 22a to take advantage of that surface's lower softening point. The low index higher melting point surface then has more dwell time in the furnace before being reshaped. However, the reverse of this arrangement is also feasible.

In FIG. 4a, the blank 10 is shown in trapezoidal shape (a conic section in three dimensions). While not critical in the practice of the invention, this shape is one approach to reducing excess material and to accommodating the pre-slumped blank into the slumping fixture without superfluous material along the edges which would cause compression in the center of the blank.

As in FIG. 2c, the region 20 to be ground away is depicted in FIG. 4b, which shows the lens blank after the pressing operation but prior to the grinding operation.

Pneumatic pressing may also be employed in the practice of the invention. First, the lens blank is clamped in place. Second, pressure is increased on one side to deform the glass with or without a mold to form the desired conformed blank. Alternatively, vacuum may be used to deform the glass. In both cases, viscous flow is avoided, and the process is done at the temperature described above.

The selection of the glass composition is only limited to those glasses which are suitable for forming axial gradient plates. Due to possible reaction of the glass with the tooling, appropriate selection of the tooling is required. However, such reactions are well-known and easily determined by the person skilled in the art. Typically, the tooling comprises a high melting point refractory material.

Tooling should be selected that is shaped to optical specifications easily. The surface figure requirements for the tooling should be less than about one wavelength.

The processing temperature used in the process of the invention is just above the softening point of the lowest index layer. For most glass families of interest with related composition, this range is typically about 600° to 800° C. Lens blanks will require annealing after pressing.

It has been found that very little flow occurs during the slumping process, at least for large radii of curvature. As the amount of slumping increases, the increased stress on the blank will cause the index profile to change during the bending process. This systematic change can be measured and the original profile modified so that after slumping, the final profile is of the desired shape.

Again, it will be noted that the mold need not be spherical; a large variety of mathematical shapes are possible and available for the optical designer to incorporate into optical elements that accomplish different tasks.

There are a myriad of designs possible employing one or more optical elements incorporating the shaped gradient index of refraction taught herein. As one of many such examples, after slumping plates to one of the generalized shapes, such as spherical, ellipsoidal, etc., the shaped plates, after polishing, can be used as corrector plates in optical systems.

It may be desirable to carry out the slumping process more than once on a given material. For example, it may be desirable to provide a spherical gradient in one direction and a cylindrical gradient in an orthogonal direction; such a combination of gradients would be useful in correcting an elliptical laser beam to a circular beam. Such multiple slumping may be done on the same material to effect a plurality of shaped gradients.

Annealing of the material after slumping may be done to relieve any stresses that may be caused by the slumping process. Annealing for glasses depends on glass composition, the degree of slumping, and the thickness of the gradient. The annealing is initiated at a desired first temperature (determined from the glass composition having the highest annealing point for any of the glass compositions) and the material is cooled at a given rate, typically on the order of about 0.5° C./min, to a desired second temperature (determined from the glass composition having the lowest strain point for any of the glass compositions). For most lens blanks having a graded index of refraction, this means that the glass composition with the lowest index of refraction governs the annealing point, while the glass composition with the highest index of refraction governs the strain point.

INDUSTRIAL APPLICABILITY

The fabrication of radial and generalized radial gradients from axial gradients is expected to provide lenses having unique and custom-designed profiles. Such lenses are anticipated to find extensive use in all or most optical systems; the combination of radial and axial index profiles will find many uses in both imaging and nonimaging optical systems.

EXAMPLES

EXAMPLE 1

One glass lens sample was prepared from six layers each, a thick top layer (low index region), four intermediate thin layers (graded region), and a thick bottom layer (high index region).

To determine the placement of the gradient within the sample, the plate thicknesses were recalculated from the starting 1.5 inch pre-melt plate diameter to the post-melt mold dimensions of 1.6 inch in diameter:

Low Index Region: 1.5 inch dia=0.211 inch; 1.6 inch dia=0.185 inch;

Graded Region: 1.5 inch dia=0.154 inch; 1.6 inch dia=0.135 inch; and

High Index Region: 1.5 inch dia=0.211 inch; 1.6 inch dia=0.185 inch.

Based on measurement data from a previous 40 hour diffusion experiment, it was estimated that the graded region would expand slightly into both the high and low index regions.

The high index face was used as reference plane to maintain the gradient axis. All removal of material was based on the location of this plane. This surface was lightly ground in an even manner, removing a minimum of material (<0.005 inch), while not disturbing the angular orientation to the sides of the material.

The low index region after the initial axial melt was not of a constant thickness. As the top surface cooled, it became concave shaped. It also contained a layer of distortion ≈0.075 inch deep from the lowest point on the top surface. The low index surface was ground parallel to the high index surface until the sample thickness was 0.415 inch.

The high index face was then ground parallel to the low index face until the total sample thickness was 0.390 inch. The sample was now ready for slumping. The graded region was now situated between 0.140 inch and 0.315 inch from the high index face in the sample. The total change in index of refraction for the sample was $\Delta n = 0.037$.

The high index face was slumped over a convex refractory fixture with a radius of 8.268 inch (21.0 cm). The radius must be chosen to satisfy the equation $R > (d^2 + g^2)/2g$, where R is the slump radius, d is the sample diameter, and g is the thickness of the graded region.

The ideal slumping temperature for this material is based on the following information, shown in Table I below. The slump temperature was 600° C. This temperature was determined by a series of tests using homogeneous material with softening points comparable to the gradient sample.

TABLE I

| | Data for Glass Samples. | |
|---|---|---|
| | Temperature, °C. | |
| Parameter | Low Index Region | High Index Region |
| Softening point | 615 | 607 |
| Annealing point | 499 | 481 |
| Strain point | 430 | 412 |

The sample was core drilled to a one inch diameter before slumping.

Figure 5:
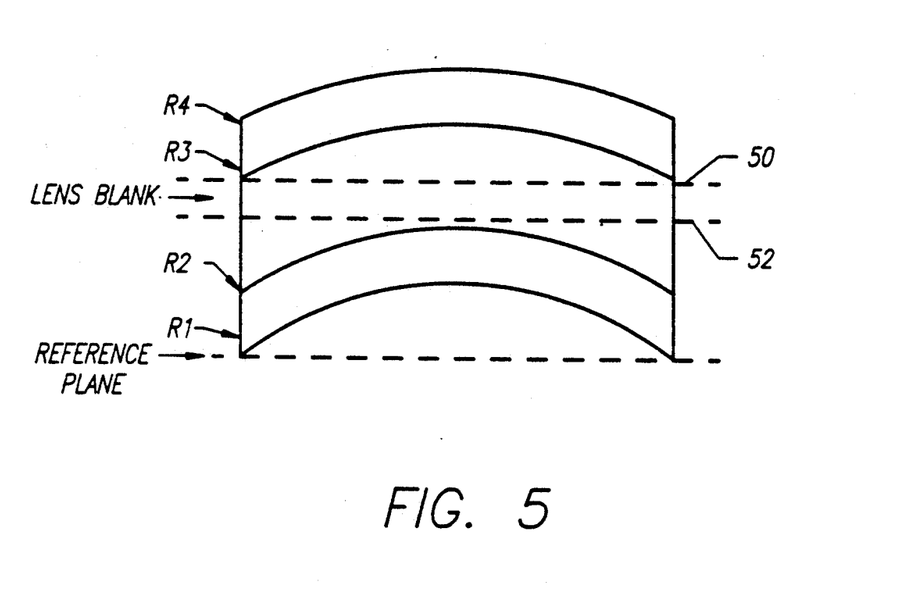
FIG. 5 provides the reference data for a post-slump grind of the lens blank.

The flat, parallel finished lens within the slumped blank lies between a straight line 50 drawn between the outer edges of $r_3$ on the low index end and a parallel line 52 that intersects the center of $r_2$. FIG. 5 shows the post-slump grind and the radii of the external surfaces and the region of varying index (between $r_2$ and $r_3$). In FIG. 5, $r_1 = 8.268$ inch; $r_2 = 8.408$ inch; $r_3 = 8.523$ inch, and $r_4 = 8.658$ inch.

The post-slump grinding operation began with the removal of the concave surface ($r_1$) on the high index end. The high index surface was then ground evenly, maintaining perpendicularity with the outer edges of the blank. When this concave surface cleared at the center, the edge thicknesses of the lens was 0.375 inch and the center thickness was 0.390 inch.

The curvature of $R_4$ caused the difference in edge and center thicknesses. The difference was calculated using the formula $H = r - \frac{1}{2}(4r^2 - c^2)^{\frac{1}{2}}$, where H is the saggital height, r is the radius of curvature, and c is the outer diameter of the lens.

The convex $R_4$ low index surface (labeled in FIG. 5) was ground and polished flat and parallel to the high index surface until the center and edge thicknesses of the lens was 0.279 inch. The high index surface was then ground and polished flat and parallel to the low index surface until the center and edge thicknesses of the lens were both 0.125 inch, which completed fabrication of the lens.

In transmission, the sample was measured to have a 22 meter focal length (converging)

EXAMPLE 2

A second glass lens with parallel front and back faces was also fabricated in the same manner as Example 1. The physical parameters were different. The total index change was larger, $\Delta n = 0.085$, as was the thickness, $t = 0.537$ inch, $T = 0.650$ inch ("t" and "T" are defined in Eqn. 9). The diameter was 1.52 inch. The front and back surfaces were polished flat.

In transmission, this lens was measured to have a 3 meter focal length (converging).

What is claimed is:

1. A method of making a lens blank having a shaped gradient of index of refraction such that the index of refraction varies substantially continuously in plural directions within the lens blank from a plate having a substantially continuous axial gradient of index of refraction ranging from a low index value to a high index value, with substantially planar contours of constant index of refraction, said plate having its lowest index value on one surface and its highest index value on the opposite surface, comprising:

(a) controllably deforming said plate to provide a deformed plate having curved upper and lower external surfaces, so that contours of constant index of refraction are disposed parallel to said curved external surfaces; and (b) removing portions of said curved upper and lower external surfaces of said deformed plate to provide said lens blank having an internally shaped gradient of index of refraction.

2. The method of claim 1 wherein said curved upper and lower external surfaces are smooth curves of revolution and wherein said lens blank is ground to a desired shape of a final lens.

3. The method of claim 2 wherein said curved upper and lower external surfaces are selected from the group consisting of spheroidal, hyperboloidal, paraboloidal, ellipsoidal, and aspheroidal.

4. The method of claim 2 wherein said curved upper and lower external surfaces are cylindrical or generalized cylindrical, which are then ground to a desired shape of a final lens.

5. The method of claim 1 wherein said deformation of said plate is controllably altered by allowing said plate to slump in a mold having an appropriately shaped mold surface at a temperature at approximately the softening point of the lowest index surface.

6. The method of claim 1 wherein said deformation of said plate is controllably altered by placing one surface of said plate on a convex-shaped lower tool, heating said plate to a temperature at approximately the softening point of the lowest index surface, and pressing said plate with a cylindrical sleeve having a concave surface.

7. The method of claim 6 wherein the highest index surface is placed against said convex surface.

8. The method of claim 6 wherein the lowest index surface is placed against said convex surface.

9. The method of claim 1 wherein said deformation of said plate is controllably altered by pneumatic pressing caused by applying pressure or vacuum to one side of said plate to cause deformation of said plate.

* * * * *